Dec. 2, 1941.        D. W. FETHER        2,264,747
TUBULAR RIVET
Filed May 26, 1941
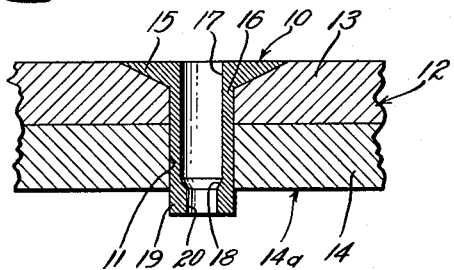
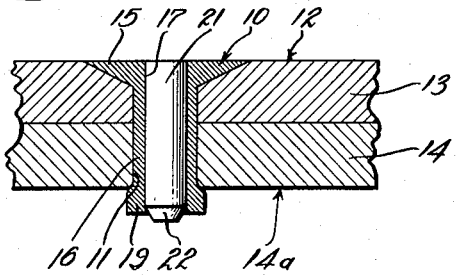
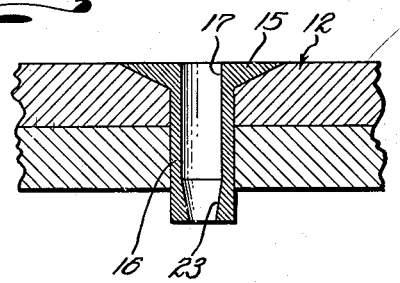
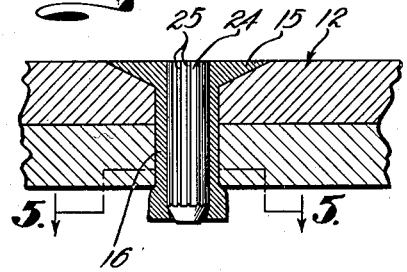
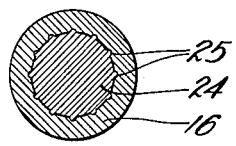
Inventor
DONALD W. FETHER
H. Calvin White
Attorney Patented Dec. 2, 1941

2,264,747

UNITED STATES PATENT OFFICE 2,264,747

TUBULAR RIVET

Donald W. Fether, Downey, Calif.

Application May 26, 1941, Serial No. 395,184

5 Claims. (Cl. 85—40)

This invention has to do generally with improvements in rivets of the type used in aircraft fabrication and like manufactures, and is concerned particularly with rivets made for "blind" riveting, i. e. where the form and condition of the work do not permit access to the inner end of the rivet to support it for enlargement or expansion. Typical examples of such work are instances where sheet material is to be riveted to tubular members, or to the tip portions of airplane wings. In such situations the inner ends of the rivets within the tube or wing surface are inaccessible for application of an expanding abutment, and the rivet therefore must be capable of end expansion by working entirely from the outside or head end of the rivet.

The invention may be further characterized as relating to tubular rivets, the inner ends of which are adapted to be expanded to an enlarged size greater than the diameter of the work opening through which the rivet is inserted, by pins driven into and permanently contained within the bores of the rivets. My primary object is to provide certain improvements which, though of a particular nature, adapt this type of rivet by virtue of various increased strength factors, to important purposes and uses for which heretofore known rivets of this kind are unsuitable, and in fact would be condemned for the purposes of such manufactures as indicated above. The importance of the features represented by the invention can perhaps best be appreciated by first referring briefly to known tubular rivets of the present type, and their shortcomings for purposes where not only must the riveted joint have high strength, but the rivets themselves after expansion must remain unimpaired in tensile and shearing strengths and the pin and stem sections of the rivet brought to a condition of substantial integration.

As illustrative of the more commonly known types of rivets whose upsets are formed by a permanently and self-contained driving pin, reference may be had to the slotted or split stem variety. These rivets have their inner or expansible ends split or slotted at circular intervals for the purpose of facilitating expansion or spreading of the stem and assuring that sections of the stem will spread apart at predetermined locations to form the enlargement, the spread of course resulting from the expander pin being driven into the rivet. At least for high strength purposes, such forms of rivets are unsuitable, principally for the following reasons. Due to its split condition, the stem of the rivet is weakened in respects adversely affecting the strength of the riveted joint. Secondly, this same condition prevents an important and essential unitized relationship between the enlarged end of the rivet and the expander pin, in that being circumferentially interrupted, the split end of the rivet cannot have a continuously circular and essentially tight unitizing engagement or embracement about the pin. Reference might also be had to other actual or proposed prior practices, but it will suffice to state that each example that has come to my attention lacks the features and improvements of the present invention, which are essential to such purposes as extremely high strength in the joints and rivets themselves.

In accordance with the invention, I form the tubular section of the rivet with a single wall thickness, thereby initially assuring a certain structural uniformity and consistency throughout its length, and predetermined expansibility upon driving the expander pin. In contradistinction to prior practices as outlined above, the inner end of the rivet is purposely made to remain continuously circular after expansion, but without requiring the metal to undergo expansive deformation or strains that will weaken the rivet with respect to either tensile or shearing stresses. In this manner, it is found possible to expand the end of the rivet sufficiently to give the upset an axial or longitudinal shearing strength at least as great, or greater than the tensile strength of the rivet, and to preserve the necessary transverse shearing strength. Also, it is made possible to obtain a high degree of integration between the rivet stem and the expander pin due to the fact that the enlarged end, by virtue of its expanded condition and continuously circular or interrupted formation, tightly embraces its contained portion of the pin. As a result, the rivet is given maximum internal support by the pin (particularly since the latter may be caused to tightly engage the rivet bore wall throughout its length), and the pin is very tightly held against withdrawal from the bore.

The invention provides additional features of importance with respect to the nature and composition of the rivet and pin metals, and their relationship in securing maximum rivet and joint strengths. Preferably, the rivet is made of aluminum, a suitable aluminum lloy, or other metal capable of acquiring an oxidized or otherwise hardened outer surface or shell, as for example by such processes well known commercially as "anodizing" or "aluminating" treatments, according to which the rivets may be given an oxidized and hardened outer shell by treating them in an electrolytic bath of chromic or sulphuric acid, and in which a current potential is maintained, and with the work, i. e. the rivets, utilized as the anode. Preferably, the rivets are thus "anodized" in solid form and before being drilled to tubular shape. In this manner, the tubular rivet is given a relatively hard outer shell, and a relatively soft interior. The expander pin preferably is made of harder metal, such as steel or a hard aluminum alloy, to assure at least close retention of its initial size and shape after being fully driven into the rivet. The effect of driving the expander pin is thus to expand the inner and softer rivet metal against its outer harder shell, and to secure in all practical respects, complete unitization or integration between the relatively hard expander pin and the softer rivet metal into which it is driven.

A more complete understanding of the invention will be had from the following detailed description of certain illustrative and preferred embodiments shown in the accompanying drawing, and in which:

Fig. 1 is a sectional view showing the tubular rivet within the work and before insertion of the expander pin;

Fig. 2 shows the pin fully driven and the inner end of the rivet expanded;

Figs. 3 and 4 are sectional views similar to Figs. 1 and 2, illustrating certain variations in the forms of the rivet and pin; and Fig. 5 is an enlarged cross-section of the rivet taken on line 5—5 of Fig. 4.

Referring first to Fig. 1, the rivet, generally indicated at 10, is shown to be inserted through an opening 11 in the work 12, which, typically, may consist of an outer layer of sheet metal 13 and an inner layer or wall 14 as that of a tube or airplane wing tip, the interior surface 14a of which is inaccessible, thereby rendering necessary the use of "blind" riveting operations. While the head 15 of the rivet typically is shown to be countersunk in the work, it should be understood that the rivet head may have a rounded or any other suitable shape, since particularities in the form of the head constitute no part of the invention. The stem 16 of the rivet is of tubular form, containing a bore 17 and a radially inwardly extending surface 18 adapted to be engaged by the pin to expand the end portion 19 of the stem, as will presently appear. In the form of the invention shown in Figs. 1 and 2, surface 18 is of annular form that will insure expansion of the stem end 19 to an extent sufficiently beyond the diameter of the work opening 11, to assure enlargement of the rivet to a degree preventing it from being pulled through the work opening under prescribed high strength test standards, but without the rivet becoming weakened or ruptured by reason of the expansion. By tapering shoulder 18 toward the relatively small diameter end bore 20, provision is made for securing effective wedge coaction with the pin as the latter is driven against the shoulder to expand the end of the rivet. It may be further observed that the interengaging end portions of the rivet and pin are made to project sufficiently beyond the work opening, to give the upset proper strength against longitudinal shearing, which as previously observed, may be as great as, or greater than the longitudinal tensile strength of the rivet.

The pin 21 may consist simply of a straight, cylindric element having its inner end surface 22 annularly tapered in accordance with the taper of the rivet stem shoulder 18. It will be understood that the pin may constitute an element separate and apart from the rivet 10 before the rivet is inserted in the work, or that for purposes of convenience in handling and facilitating riveting operations, the pin and rivet first may be assembled with the pin partially inserted, i. e. snugly or force-fitted within the rivet. Fig. 2 shows the expanded condition of the rivet, and the substantial integration of the pin and rivet after the pin is driven fully into place. Upon being driven past the point of engagement with the rivet shoulder 18, the pin expands the end portion 19 to a degree and in a manner permitting an accurate and carefully predetermined degree of enlargement.

While this degree of enlargement may vary depending upon such factors as the size of the rivet or its opening or the work opening, and the strength for which the joint is designed, it is generally desirable and for many contemplated purposes important that the rivet expansion does not exceed a predetermined maximum, or exceed the elastic limits of the rivet metal to a degree that will break or impair the desirable strength of the rivet metal. This maximum, i. e. the outside diameter of the enlargement, may be placed at 1.2 times the normal diameter of the rivet stem 16. As an example, satisfactory joints and rivet strengths have been obtained where a ⅛ in. rivet is given an end upset of about .019 in. in excess of the normal stem diameter. As previously explained, with the outer surface of the rivet pretreated to give a hardened shell, the steel pin 21 being slightly larger in diameter than the diameter of the stem bore 17, directly engages and expands the inner and softer rivet metal against the hardened outer shell within the work bore and end 19 of the rivet, to produce both proper expansion of the rivet and unitization of the stem and rivet throughout their interengaging lengths.

The rivet shown in Fig. 3 differs from that previously described, only with respect to the form and extent of its tapered pin engaging surface. Here the pin is driven against an annularly tapering surface or shoulder 23 which, like shoulder 18 in Fig. 1, starts from within the work opening 11, but continues on a taper to the extreme end of the pin. The effect in this instance is to give the upset a slightly increasing degree of enlargement toward the end of the pin, depending of course upon the angularity of the tapered surface 23. As shown in Fig. 4, the pin 24 may be provided with longitudinally extending surface projections 25 or other suitable irregularities to further assure the pin against becoming dislodged from or backing out of the rivet. Ordinarily the smooth surface pin 21 of Fig. 2 will be preferred, since the tightness of the rivet grip about the pin and the engagement between the pin and the relatively soft interior metal of the rivet, will effectively hold the pin in place.

Referring to Figs. 1 and 3, it will be noted that the tapered portions 18 and 23 of the rivet bores start at a location within the work opening 11, i. e. some distance from the inner surface 14a of the work. This location of the tapered surfaces with relation to the end of the work opening is purposely made in order that the pin will tend to expand that portion of the rivet adjacent the enlargement 19, within the work opening, and thereby effect not only a tight engagement and seal between the expanded rivet and the inner end of the work opening, but also place the rivet under sufficient longitudinal tension to assure its remaining tightly in place.

I claim:

1. In a rivet of the character described, a metallic tubular stem having a single wall thickness and adapted to be inserted through an opening in the work, a metallic pin adapted to be driven into and permanently contained in the bore of the stem, said stem bore having a radially inwardly extending surface engaged by the pin to expand the end of the stem to an enlargement greater than the diameter of the work opening, said enlargement being of continuously annular formation tightly encircling and thereby becoming substantially integrated with the pin, and the outer surface of the stem metal being hardened so that the pin expands relatively softer interior metal of the stem against its hardened outer shell.

2. In a rivet of the character described, a metallic tubular stem having a single wall thickness and adapted to be inserted through an opening in the work, a metallic pin adapted to be driven into and permanently contained in the bore of the stem, said stem bore having a radially inwardly extending surface engaged by the pin to expand the end of the stem to an enlargement having a diameter not in excess of about 1.2 times the diameter of the work opening, said enlargement being of continuously annular formation tightly encircling and thereby becoming substantially integrated with the pin, and the outer surface of the stem metal being hardened so that the pin expands relatively softer interior metal of the stem against its hardened outer shell.

3. In a rivet of the character described, a relatively soft aluminum tubular stem having a single wall thickness and adapted to be inserted through an opening in the work, a relatively hard aluminum alloy pin adapted to be driven into and permanently contained in the bore of the stem, said stem bore having a radially inwardly extending surface engaged by the pin to expand the end of the stem to an enlargement greater than the diameter of the work opening, said enlagement being of continuously annular formation tightly encircling and thereby becoming substantially integrated with the pin, and the stem having an oxidized and hardened outer shell so that the said pin expands relatively softer interior metal of the stem against its hardened outer shell.

4. In a rivet of the character described, a metallic tubular stem having a single wall thickness and adapted to be inserted through an opening in the work, a metallic pin adapted to be driven into and permanently contained in the bore of the stem, said stem bore having a radially inwardly extending surface engaged by the pin to expand the end of the stem to an enlargement greater than the diameter of the work opening, said enlargement being of continuously annular formation tightly encircling and thereby becoming substantially integrated with the pin, and the outer surface only of the stem metal being hardened so that the pin directly engages and expands relatively softer interior metal of the stem against its hardened outer shell.

5. In a rivet of the character described, a metallic tubular stem having a single wall thickness and adapted to be inserted through an opening in the work, a metallic pin adapted to be driven into and permanently contained in the bore of the stem, said stem bore having a radially inwardly extending surface engaged by the pin to expand the end of the stem to an enlargement having a diameter not in excess of about 1.2 times the diameter of the work opening, said enlargement being of continuously annular formation tightly encircling and thereby becoming substantially integrated with the pin, and the outer surface only of the stem metal being hardened so that the pin directly engages and expands relatively softer interior metal of the stem against its hardened outer shell.

DONALD W. FETHER.